Nov. 5, 1935.                W. E. NEWMAN                2,019,925
                        INDICATING AND CONTROL DEVICE
                            Filed Dec. 29, 1934
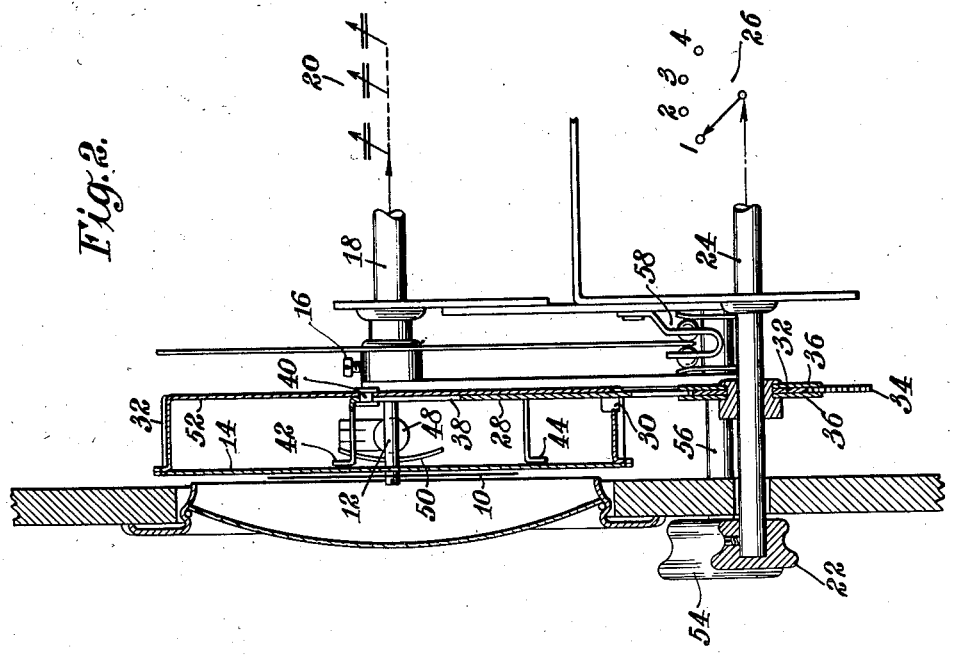
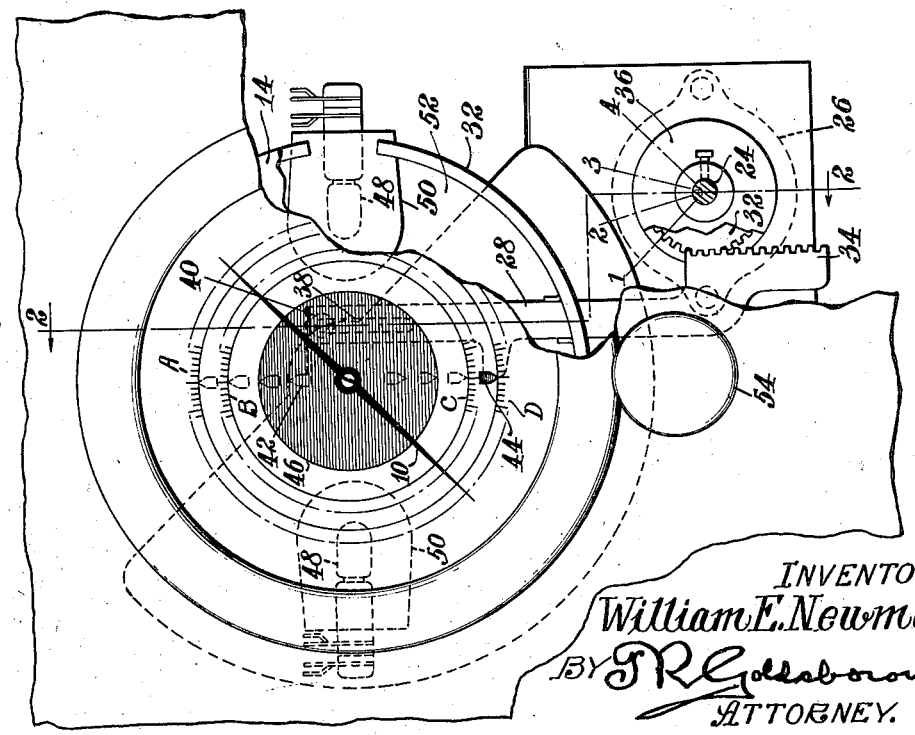
INVENTOR:
William E. Newman,
BY T. R. Goldsborough
ATTORNEY.

Patented Nov. 5, 1935

2,019,925

UNITED STATES PATENT OFFICE 2,019,925

INDICATING AND CONTROL DEVICE

William E. Newman, Moorestown, N. J., assignor to Radio Corporation of America, a corporation of Delaware Application December 29, 1934, Serial No. 759,747

8 Claims. (Cl. 116—124.1)

My invention relates to improvements in indicating and control devices.

One of the objects of my invention is to provide an improved indicating and control device adapted particularly for use in all-wave radio receivers to adjust the same for reception on selected bands over a predetermined frequency range, and to provide means for indicating the particular band for which the receiver is adjusted as well as the particular frequency or station in such band to which the receiver is tuned.

Another object of my invention is to provide an improved indicating and control device of the character referred to which is relatively simple in construction and reliable in operation, and which can be constructed as a unit and applied readily to a radio receiver of conventional design.

Other objects and advantages will hereinafter appear.

In accordance with my invention, a pointer is supported intermediate its ends for rotation about an axis through the center of a dial. The dial is provided with scales disposed on circles about the center and at different distances radially therefrom, each scale being for a different band over the entire frequency range. The pointer is connected for rotation with the shaft of the tuning condenser to indicate the station or wave length to which the receiver is tuned. An indicating element, mechanically connected to a control shaft for actuating a wave-change switch, assumes different positions with respect to the dial in accordance with the position of this switch to indicate which scale on the dial is to be read for any particular setting of the receiver. Provision is made for uniform illumination of the entire dial, and the casting of a shadow on the face thereof to indicate which scale is to be read.

My invention resides in the improved construction of the character hereinafter described and claimed.

For the purpose of illustrating my invention an embodiment thereof is shown in the drawing, wherein Figure 1 is a front elevational view, partly broken away and partly in section, of an indicating and control device constructed and operating in accordance with my invention; and Fig. 2 is a sectional view, partly diagrammatic, the section being taken on the line 2—2 in Fig. 1.

In the drawing, the reference numeral 10 designates a pointer fixed intermediate its ends to a spindle 12 extending through the center of a dial 14. The spindle 12 is fixed by a set screw 16 to the shaft 18 of a tuning condenser 20 of conventional design.

The dial 14 is translucent and is provided with scales such as A, B, C and D, disposed as shown on arcs of circles about the center of the dial and on opposite sides of the center. These scales are used, respectively, in tuning over the different bands of the entire frequency range.

For the purpose of adjusting the receiver for operation over a particular band, a knob 22 is turned to rotate a shaft 24, whereby a wave-change switch 26 of conventional design is moved to any one of its positions 1, 2, 3 and 4.

Provision is made, for indicating to the operator the particular scale on dial 14 to be read, by means of an indicating element 28 extending upwardly through an opening 30 in the casing 32 which supports the dial 14. The element 28 is moved linearly upon rotation of the shaft 24 by means of a mechanical connection with the latter comprising a sprocket wheel 32 fixed to the shaft and meshing with a rack 34 at the lower end of the indicating element.

Discs 36 on opposite sides of the sprocket wheel 32 extend outwardly beyond the same and operate to hold the rack 34 and the sprocket wheel in mesh, and are spaced sufficiently to permit free sliding movement between the rack and the adjacent faces of these discs. The element 28 is provided with a slot 38 which receives a stud 40 for the purpose of guiding the element at its upper end.

The element 28 is provided with indicating parts 42 and 44 spaced along the same and disposed for registration, respectively, with the scales on opposite sides of the center of the dial.

The dial 14 is made opaque at its central portion 46 over a circle having a diameter somewhat less than the distance between the indicating parts 42 and 44.

The entire face of the dial 14 is illuminated uniformly by light from lamps 48 which is reflected from reflectors 50 and then from the inside surface 52 of the base of the casing 32.

The condenser shaft 18 is rotated by turning a knob 54 to rotate a shaft 56 mechanically connected to the condenser shaft through a reduction device 58 of conventional design.

In operation, with the wave-change switch 26 in position No. 1, as represented in Fig. 2, the position of the indicating element 28 is such as to place the indicating part 44 so that it casts its own shadow on the dial, adjacent the scale D, as shown in Fig. 1. In this position of the element 28, the indicating part 42 is masked off or obscured from view by the opaque portion 46 of the dial. The receiver is then adjusted for reception over the band represented by the scale D, and the shadow of the indicating part 44, adjacent the scale D, indicates to the operator that it is this scale which is to be read as the knob 54 is turned in tuning.

As the wave-change switch is moved to position No. 2, the element 28 is raised to cause the indicating part 44 to cast its shadow adjacent the scale C, thereby indicating to the operator that the receiver has been adjusted for reception over the band represented by this scale. In this position of the element 28, the indicating part 42 is still masked off or obscured from view by the opaque portion 46 of the dial.

As the wave-change switch is moved to positions Nos. 3 and 4, the element 28 is raised so that the indicating part 42 casts its shadow, first adjacent the scale B, and then adjacent the scale A, to provide the proper indication as to which band the receiver is adjusted for. In these positions of the element 28, the indicating part 44 is masked off or obscured from view by the opaque portion 46 of the dial.

From the foregoing it will be seen that I have provided an improved indicating and control apparatus for all-wave radio receivers embodying a full-vision, illuminated dial provided with different scales for the respective bands, and in which there are means actuated upon adjustment of the wave-change switch to indicate to the operator which one of the scales is to be read.

Although but one embodiment of my invention has been described, it will be understood that various modifications within the conception of those skilled in the art are possible without departing from the spirit of my invention or the scope of the claims.

I claim as my invention:

1. An indicating and control device comprising a dial provided with a plurality of scales disposed in spaced relation with respect to each other, an indicating pointer associated with said dial and common with respect to said scales, a separate indicating element supported for movement transversely of said scales to selected positions adjacent the individual scales, a first control member moveable to different control positions in number the same as the number of said scales, connecting means between said member and said separate indicating element whereby the latter is moved to its respective indicating positions adjacent the individual scales when said member is moved to the respective and corresponding control positions thereof, and a second control member for effecting movement of said pointer about said dial independently of said indicating element.

2. An indicating and control device comprising a dial provided with a plurality of scales disposed respectively on arcs of circles about a common center, an indicating pointer common with respect to said scales and rotatable about said center, a separate indicating element supported for movement transversely of said scales to selected positions adjacent the individual scales, a first control member moveable to different control positions in number the same as the number of said scales, connecting means between said member and said separate indicating element whereby the latter is moved to its respective indicating positions adjacent the individual scales when said member is moved to the respective and corresponding control positions thereof, and a second control member for rotating said pointer for movement thereof across said scales and independently of said separate indicating element.

3. An indicating and control device for multi-range radio apparatus comprising a dial provided with scales disposed on arcs of circles about a common center and on opposite sides of the center, each of said scales representing one frequency range of said apparatus an indicating pointer associated with said dial and supported intermediate its ends for rotation about said center, a separate indicating element supported for movement transversely of said scales to selected positions adjacent the individual scales, a first control member moveable to different control positions in number the same as the number of said scales, connecting means between said member and said separate indicating element whereby the latter is moved to its respective indicating positions adjacent the individual scales when said member is moved to the respective and corresponding control positions thereof, and a second control member for rotating said pointer for movement thereof across said scales and independently of said separate indicating element.

4. An indicating and control device comprising a dial provided with a plurality of scales disposed in spaced relation with respect to each other, an indicating pointer associated with said dial, means supporting said dial and pointer for relative movement with respect to each other to change the indicating position of said pointer along each of said scales, an element supported for movement transversely of said scales and provided with two indicating parts spaced along said element and disposed for registration respectively with said scales to indicate which one of the latter is to be read, means for masking off from view either of said indicating parts when the other is in position to be effective, a first control member movable to different control positions in number the same as the number of said scales, connecting means between said member and said element for operating the later to place said parts in their respective indicating positions adjacent the individual scales when said member is moved to the respective and corresponding control positions thereof, and a second control member for effecting relative movement of said dial and pointer with respect to each other and independently of said element.

5. An indicating and control device comprising a dial provided with scales disposed on arcs of circles about a common center and on opposite sides of the center, an indicating pointer associated with said dial and supported intermediate its ends for rotation about said center, an element supported for movement transversely of said scales and provided with two indicating parts spaced along said element and disposed for registration respectively with the scales on opposite sides of said center, means for masking off from view either of said indicating parts when the other is in position to be effective, a first control member moveable to different control positions in number the same as the number of said scales, connecting means between said member and said element for operating the latter to place said parts in their respective indicating positions adjacent the individual scales when said member is moved to the respective and corresponding control positions thereof, and a second control member for rotating said pointer for movement thereof across said scales and independently of said element.

6. In combination, a dial provided with a plurality of scales, a pointer common to said scales, means for moving said pointer about said scales, an indicating element disposed adjacent said dial and supported for movement into registration with the individual scales to designate which one of the same is to be read, and means independent of said pointer moving means for moving said indicating element.

7. In combination, a dial provided with a plurality of scales, indicating elements disposed adjacent said dial and supported for movement into registration with the individual scales to designate which one of the same is to be read, means for moving said elements, and means for masking off from view one of said elements when another is in position to be effective.

8. In combination, a dial provided with a plurality of scales, means for casting a shadow on said dial in proximity to the individual scales, and means for moving said first-named means transversely of said scales to cause the shadow to fall in proximity to the scales selectively as determined by the extent and manner of such movement.

WILLIAM E. NEWMAN.